United States Patent [19]

Cave

[11] Patent Number: 5,247,569
[45] Date of Patent: Sep. 21, 1993

[54] SYSTEM AND METHOD FOR CONTROLLING OUTBOUND AND INBOUND CALLS IN A TELEPHONE COMMUNICATION SYSTEM

[75] Inventor: Ellis K. Cave, Garland, Tex.
[73] Assignee: InterVoice, Inc., Dallas, Tex.
[21] Appl. No.: 820,159
[22] Filed: Jan. 13, 1992
[51] Int. Cl.⁵ .............................................. H04M 3/22
[52] U.S. Cl. ...................... 379/113; 379/140; 379/309; 379/266
[58] Field of Search ............... 379/133, 113, 140, 141, 379/309, 266, 265

[56] References Cited

U.S. PATENT DOCUMENTS 4,694,483  9/1987  Cheung ................................ 379/265
4,881,261  11/1989  Oliphant et al. ..................... 379/265

Primary Examiner—Stafford Schreyer
Attorney, Agent, or Firm—Winstead, Sechrest & Minick

[57] ABSTRACT

There is disclosed an inbound/outbound call handling system and method in which outbound calls are automatically paced so that as attendants become available a valid call is completed to be handled by the available attendant. As an inbound call is received, the system responds by halting attempts to place an outbound call and queueing the inbound call for handling by the next available attendant. The system takes advantage of an algorithm which statistically monitors average call completion time, average attendant in-use time, average time to answer and probability of a valid answer. Call placing and receiving overlap is controllable in conjunction with the monitored statistical parameters to achieve operation around any desired system operating parameter. The system is controlled by a plurality of precisely defined operational tasks operating in a hierarchical manner.

45 Claims, 3 Drawing Sheets

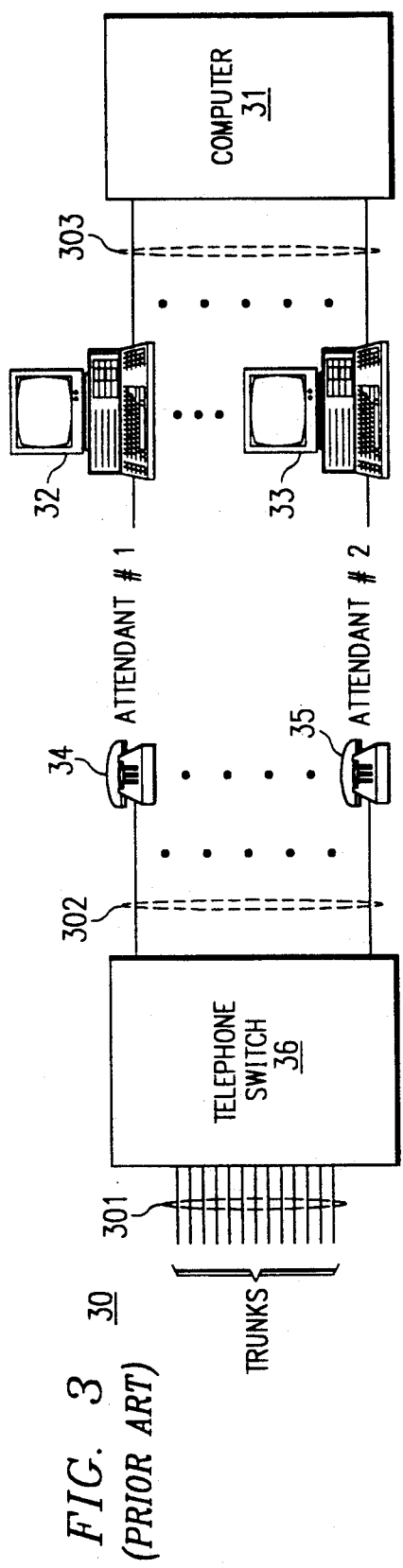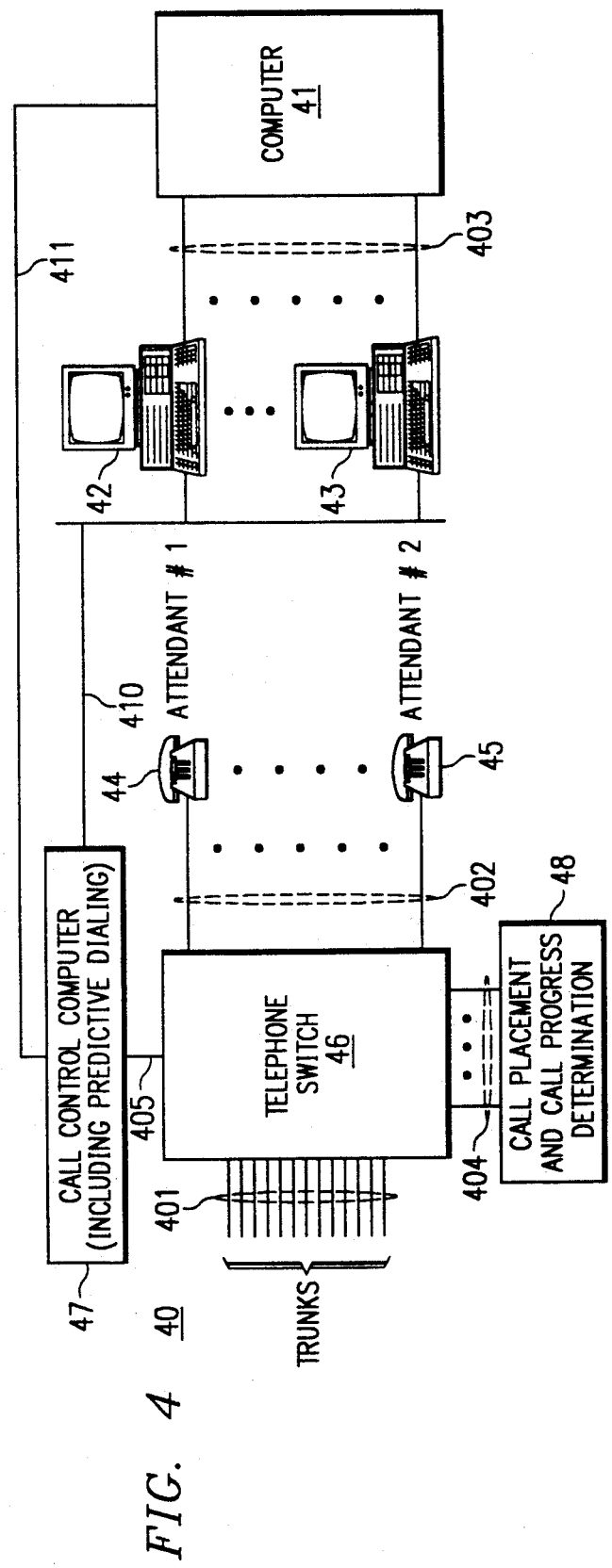

SYSTEM AND METHOD FOR CONTROLLING OUTBOUND AND INBOUND CALLS IN A TELEPHONE COMMUNICATION SYSTEM

TECHNICAL FIELD OF THE INVENTION

This invention relates to telephone communication systems which are able to handle both outbound and inbound telephone calls and more particularly to a system and method for predicting and controlling the timing (pacing) of outbound telephone calls while allowing for interspersed inbound telephone calls.

BACKGROUND OF THE INVENTION

The last few years in telecommunications have seen quantum leaps in capabilities of telecommunications systems to allow a finite pool of attendants to increase its effectiveness, whether handling primarily outbound calling or inbound calling. Systems have been developed (for example, U.S. Pat. Nos. 4,599,493 and 4,797,911) which automatically dial a number and then connect a live attendant when the called party answers the call. For efficiency, because there are always a certain number of unanswered or busy calling connections, and because some of the numbers called are, in fact, machines, it stands to reason that an automated call placing (ACP) system can improve efficiency by attempting more calls than there are attendants. To make this effective, the system should begin the call placement routine before a live attendant is actually available. However, this procedure opens the possibility of an answer occurring with no available attendant.

For the sake of economy, a system manager would like to have all of the attendants busy all of the time. On the other hand, it is important in many applications to minimize the amount of time a called party is placed on hold. It is the nature of ACP systems that these two goals are mutually exclusive, that is to say: you can have 100% attendant utilization at the cost of lengthy customer hold time, or have no customer hold time at the cost of low attendant utilization (long attendant idle time). The purpose of an outbound call pacing algorithm is to allow the system attendant to control one or the other of these parameters. By setting the pacing level, a system attendant can make a trade-off between these parameters.

Other parameters around which systems can be controlled are the number of customers waiting for an attendant, the number of disconnects on hold by answered customers, attendant idle time, or perhaps the amount of time that a customer must wait on hold.

Such an ACP system having an ability to predict call completion times and thereby maximize attendant utilization is described in a co-pending application entitled "System and Method for Controlling Call Placement Rate for Telephone Communication Systems," which was filed on Feb. 19, 1991, was assigned Ser. No. 07/657,631 and is assigned to the assignee of the present invention. The invention described therein solves the problems inherent with ACP by implementing an enhancement to existing predictive dialing systems. This enhancement allows an ACP system to automatically place calls for live attendants in such a way as to cause a new call to be answered close to the time when the attendant finishes talking on the previous call.

The purpose of any predictive dialer is to keep attendants busy handling phone calls. This means that any part of the call-placing process that can be automated, should be. Of course, a system could simply automatically dial the number for the attendant, but this typically only saves a few seconds of the attendant's time on each call.

A much more productive call task to automate is the time the attendant spends listening to the ringing and waiting for an answer. If a system can automatically determine when the phone is ringing and when a person answers the phone, then this process can be done in parallel with the attendant's conversation. This can easily save more than half the attendant's time on a call, considering that the attendant may have to place several calls before obtaining a valid answer.

To accurately predict when a new call should be placed, the predictor described performs two tasks. First, the predictor gathers statistics about call times and attendant talk times. Second, the new call placing time must be calculated and calls placed. A predictor functioning thusly is highly effective in managing outbound calling.

In stark contrast to the outbound systems previously described, are systems which handle inbound calling. Such automatic call directing (ACD) systems couple a plurality of incoming phone lines to a plurality of attendants, queuing inbound calls as they are received and assigning them to the attendants as they become free. If all attendants are busy at a particular time, incoming calls not yet assigned are placed in a queue and assigned to attendants as they become free in the order received (fair queueing). Such systems are commonplace and can handle, for example, airline, hotel and car rental reservations and help desks.

The distinct difference between ACP and ACD systems is that ACD systems have no control over incoming call rate. In other words, incoming calls occur due to action by the calling party, and the ACD system can only respond by answering an incoming call as it is received and either assigning it to a free attendant or queueing it until an attendant becomes free. In many applications, it is highly undesirable to place incoming calls on hold in a queue for a long period of time. Therefore, particular attention must be paid to sizing of the attendant pool. The attendant pool should be large enough to handle most calls at peak hours, but should not be so large as to waste significant amounts of the attendants' time during off hours. The sizing of an attendant pool for an ACD system is, therefore, not an easy task and one which is fraught with compromise. Most pools are sized so that, at many times, the pool has excess capacity to handle calls. This excess capacity is wasted and represents an undesirable expense on the part of the company employing the attendants.

A need has arisen in the marketplace for methods and systems which will handle both inbound and outbound calling to abate the excess capacity realized in an inbound application. In a pool of attendants, once a call is connected to an attendant, all calls are essentially the same. Whether a call was originated from the pool outbound, or from a customer inbound, the source becomes moot after the attendant is connected. However, there is one major difference between inbound and outbound calls. A call center manager can generally control the rate at which outbound calls are placed for attendants by utilizing a predictive dialer (ACP system). The arrival rate of inbound calls can vary widely over a day and are not controllable by a call center manager. Because of this, system managers have a much more difficult time scheduling personnel for inbound applications than outbound applications.

This problem can be alleviated by creating a system that can deal with both types of calls simultaneously, using a single agent pool. Since outbound call rates can be controlled via the predictive dialing system described above, outbound calls can be used to keep attendants busy that would normally be idle because of low inbound call rates.

For example, in a traditional inbound (ACD) application, there is always a problem matching the number of available attendants to the inbound call rate. The inbound call rate can vary randomly, causing either idle attendants or customers on hold. If some related outbound application can be handled by the same attendant pool working the ACD queue, the attendant loading can be leveled very effectively. The attendant pool can be sized to handle the largest inbound peakload without sacrificing efficiency when inbound calls drop off, due to the ability of the system to switch attendant resources to outbound calling. When inbound call rates drop off, a normal ACD will have some attendants go idle. However, with inbound/outbound call capability, as the inbound rate drops off, the system will automatically begin to increase its outbound calling rate. The calls are placed at a rate that just keeps all of the attendants that are not needed to take inbound calls busy, as in the above-described predictive dialer system.

Accordingly, a need exists in the art for an inbound-/outbound call handling system which combines the utilization advantages of a two-way system with the power of an effective predictive dialer.

SUMMARY OF THE INVENTION

The problems associated with combined inbound-/outbound call handling systems have been solved by modifying the basic algorithm as previously described in Ser. No. 07/657,631, the text of which is incorporated herein by reference. The algorithm taught therein uses statistical techniques to calculate when to start placing calls on a line so that an answer will occur just when an attendant has completed talking on a previous call. This algorithm can be modified to handle inbound calls such that if an inbound call is detected during outbound calling, the inbound call can replace the next outbound call that the predictor had scheduled, and the "answer task" (which will be discussed later) associated with that call will be stopped. In this way, the inbound call fits in with the outbound predictor, replacing outbound calls smoothly. Statistics regarding outbound calling (as will be later described) will be unaffected, and attendant loading with interspersed inbound calls will be identical to loading with pure outbound calls.

Accordingly, the present invention provides notable advantages over those found in the prior art. First, a single pool of attendants can be used to handle both outbound and inbound phone calls, thereby allowing the number of attendants devoted to the two calling tasks to be automatically sized so as to maximize efficiency. Second, the pool of attendants can be sized to handle the maximum anticipated inbound calls, rather than some lesser number of calls without fear of having large idle times or inefficient agents. During off-peak times, excess capacity can be allocated to outbound calling, resulting in far greater efficiency of use of the attendants. Finally, the predictive dialing outbound calling feature remains intact to ensure that attendants are kept busy with a steady stream of live called parties when inbound calls fail to keep the entire pool of attendants busy. These advantages result in a far more cost-effective pool of attendants and, hence, a lower cost of doing business and greater effectiveness for those engaged in call handling services.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 3 shows a prior art system using a computer for generating information for each attendant; and FIG. 4 shows a system using the predictive dialing algorithm and modification to handle inbound calls of the present invention.

DETAILED DESCRIPTION OF THE INVENTION

Figure 1:
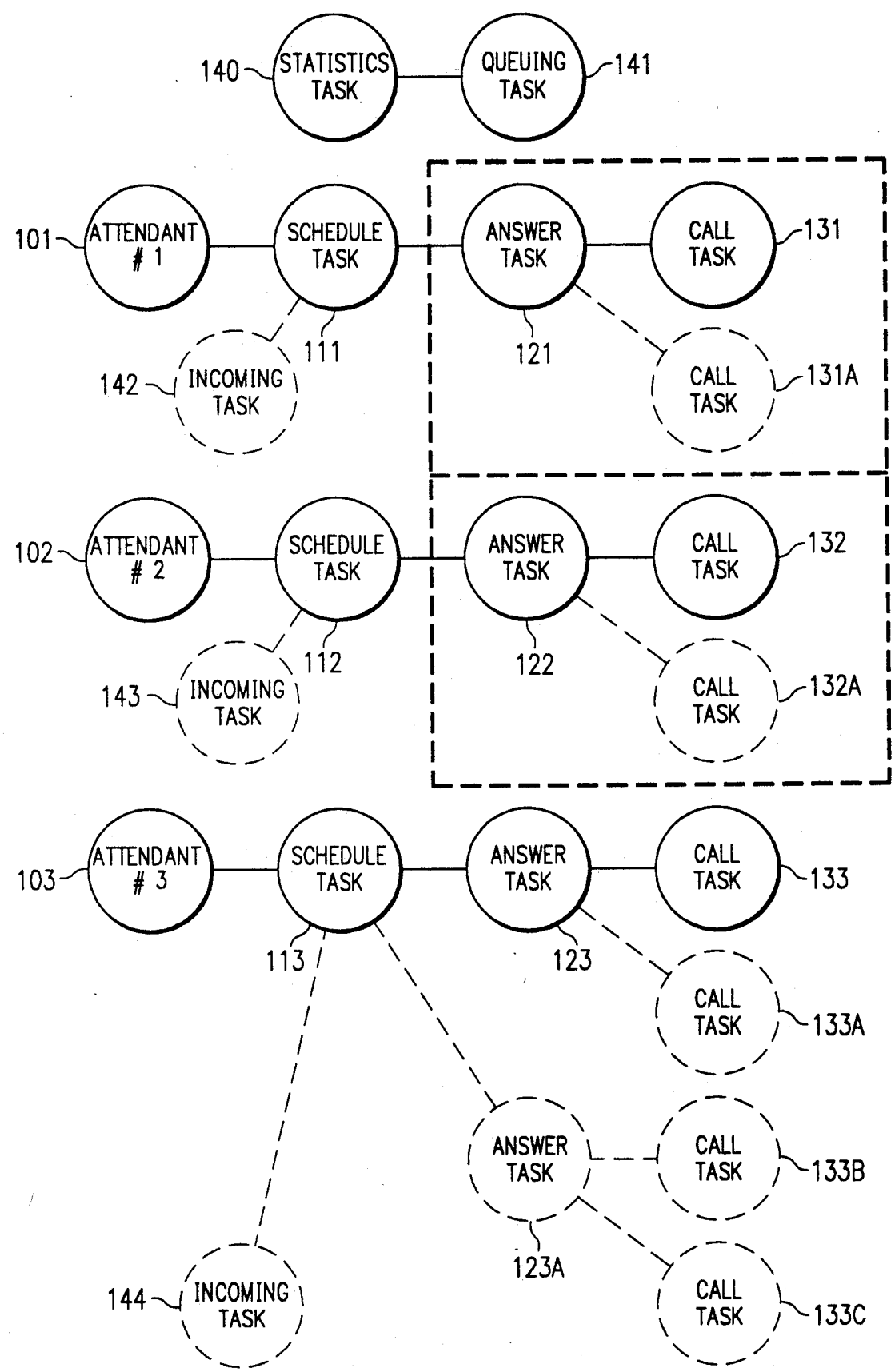
FIG. 1 shows a free attendant system and the various tasks assigned to handle each attendant.

Before beginning a discussion of the predictive algorithm and its modification to handle inbound calls, it might be helpful to understand the context in which the algorithm is to be used. This is best illustrated from a review of FIG. 3 in which telephone trunks 301 from a telephone exchange (not shown) extend through telephone switch 36 in a conventional way and via telephone lines 302 to telephone stations 34, 35, which are utilized by attendants one and two. Each of these attendants also has a key pad and computer input terminal 32, 33 connected via lines 303 to computer 31. The attendants need not be human to fall within the scope of the present invention and can be, in fact, computers or other equipment designed to interfere with telephone systems.

Traditionally, the system can be used so that computer 31 places on the screen the phone number which attendant #1 then dials in a conventional way to connect station 32 to a called party via trunk lines 301. Over the years, this has become a mainstay of telephone solicitation or telephone response. However, in recent years, a new system shown in FIG. 4 has automated the placement of calls so as to increase the efficiency of the attendants. Such a system is the subject of U.S. Pat. No. 4,829,563 dated May 9, 1989, in the name of Crockett et al., which patent is hereby incorporated herein by reference.

Typically, this has been done by computer 41 communicating over bus 411 with computer 47 and providing computer 47 with a number of telephone numbers which are to be called throughout the course of a time period. Call control computer 47 then places calls through telephone switch 46 by first establishing the call via use of a call placement and call progress determination circuit 48. The system works such that circuit 48 dials a call over one of the trunks 401 and monitors the progress of the call via lines 404 to determine whether the call has been answered, a busy signal has been returned or a no-answer situation exists. Upon determination of an answer, that information is communicated (either through switch 46 or via a direct bus connection) to call control computer 47 which in turn monitors which attendant is then available. Computer 47 then controls telephone switch 46 to complete a connection from the active trunk 401 over a selected line 402 to a selected attendant, such as attendant #1 at station 44. Call control computer 47 then, via bus 410, transmits information to terminal 42 indicating the identity of the called party. At the same time, terminal 42 communicates this information to computer 41 over leads 403. Computer 41 then accesses its database and provides the block of data to the appropriate attendant operating in this respect in the inquiry mode.

System 40 then operates to automatically place calls to called parties and must do so in a manner such that when the calls are answered, an attendant or other call handling system, such as an intelligent interactive computer system, is available. The efficiency with which call control computer 47 performs its function determines the efficiency and thus the profitability of system 40.

In addition, the efficiency with which call progress determination can be made is an important factor and is the subject of a co-pending patent application entitled "Call Progress Detection Circuitry and Method", Ser. No. 07/657,631, which application is hereby incorporated herein by reference.

For the purposes of this invention, definitions of pertinent statistical parameters of a predictive dialer are as follows:

AAIUT: Average Attendant In-Use Time. This is the average time that each individual attendant is connected to a call and unavailable to take new calls. This time is a combination of the time that an attendant is connected to a called party as well as any wrap-up time after the call when the attendant is not available for new calls. The pacing task can calculate either an individual average AAIUT for each attendant's recent history or an overall average of all attendant's AAIUT, using a sliding window average. Individual averages work well for attendant groups under 5-8 attendants, while an overall average is adequate for groups larger than that. Usually the average is taken over the last 20-40 calls. The AAIUT average can then be used by the pacing task to predict when each attendant will be available next to take more calls. The abbreviation AAIUT will be used to describe this window-averaged attendant in-use time. Again, this is derived over the last N calls.

PA: Probability of Answer. This is defined as the ratio of answered to no-answer calls. A probability of answer of 0.4 indicates that there is a 40% probability that any particular outbound call will be answered and require an attendant. This statistic is derived as a first step to determining average time to answer (ATTA).

ACT: Average Call Time. This is defined as the average time to place a single call in the system. This is essentially the average of a parameter called the call interval (CI) that is measured for each call placed on a campaign. CI is defined as the time that a phone line is involved in the process of a call, and no attendant is attached. All calls have a CI, but it is defined differently on attendant handled (answered) and automatically-handled (no answer) or busy calls. For automatically handled calls, CI is defined as simply the time from line seizure and dialing to disconnect. This could be a no-answer call, busy or wrong-number intercept call. For answered calls, CI is defined as the time from line seizure to called-party answer. CI does not include called-party on-hold time (CPHT). ACT is an average of CI over all types of calls on the system, which includes no-answer, busy and answered calls. ACT describes a window-averaged call intervals in this document.

The pacing task can use a sliding window average of call intervals to determine the average single call time for the system's recent calling history. ACT is used with PA to derive ATTA.

ATTA: Average Time-to-Answer. This is defined as the average time it takes to place a series of calls until an answer occurs on one of the calls. The calls are placed serially on a single line and ATTA is defined as the time from the start of the first call to the first answer. One method of calculating this statistic is by timing the system's answer call attempts from start to first answer, and developing a windowed average of the last N answered task times. However, if the call list has a low probability of answer, it may take a long time to directly calculate ATTA. A more efficient way to calculate ATTA is to divide the windowed ACT by PA. Since both ACT and PA can be derived after every call, ATTA can also be derived after every call, instead of waiting for an answer to occur.

The manner of calculating the variables ATTA and AAIUT are discussed at length in U.S. application Ser. No. 07/657,631, which has been incorporated herein by reference. The predictive dialer uses all of these statistics in conjunction with a delay parameter, which allows a system manager to balance attendant utilization with customer hold time, to perform its predictive dialing task. Again, the present invention's contribution is to marry receipt of inbound calls to the predictive algorithm to thereby allow a single system and a single pool of attendants to handle both inbound and outbound calls with great efficiency and effectiveness.

The importance of utilizing proper algorithms and of controlling the system for flexibility will now be discussed with respect to FIG. 2.

Figure 2:
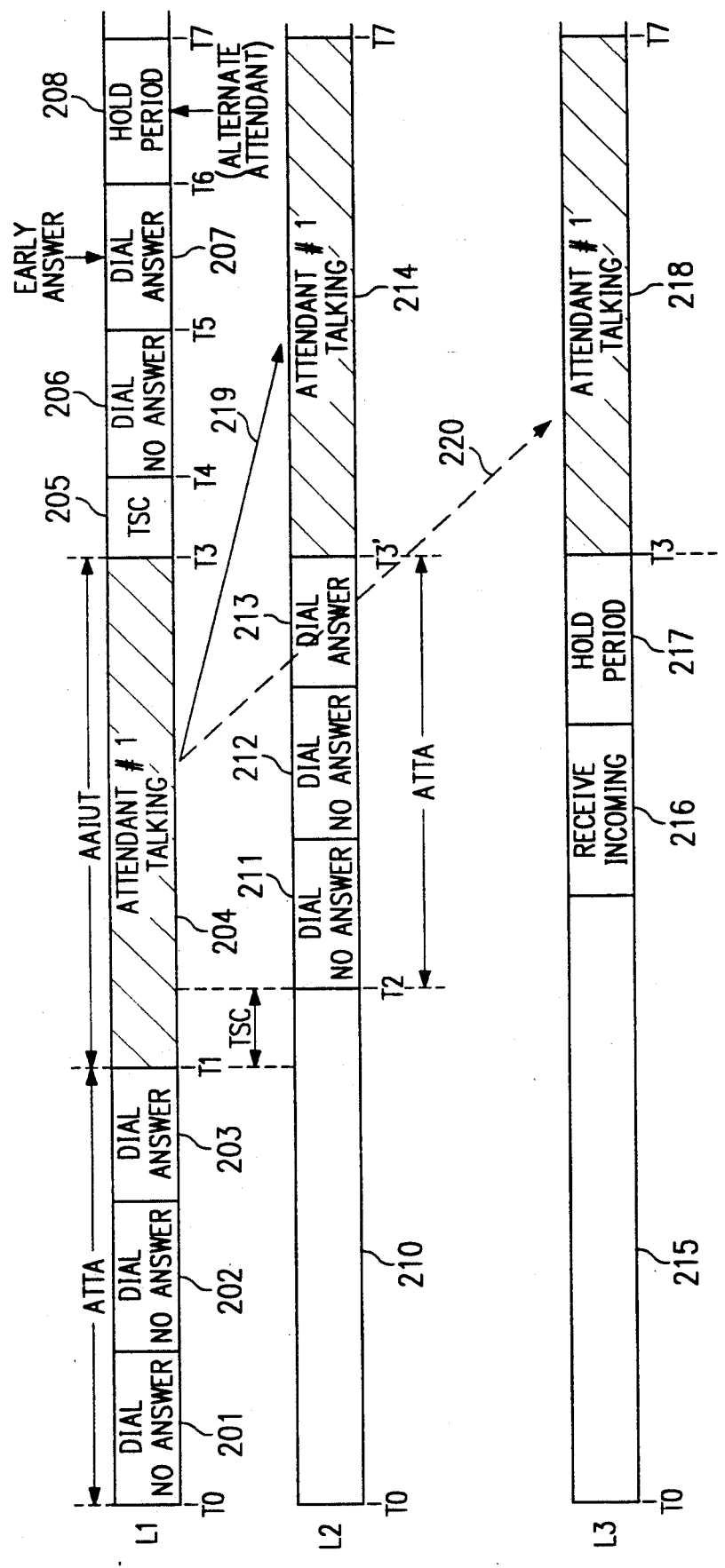
FIG. 2 shows timelines of the activity on three station lines.

Turning now to FIG. 2, let us look at line L1. At time T0 as shown in box 201, there is a dial with a no-answer which means the system dialed the number and there was no answer. The system then determines this fact and dials another number, again with no answer, as shown in box 202. In box 203, the dialed number answers and a live person comes on the line. Using the calculation ATTA=ACT/PA, if we have previously determined ACT and PA, we know the average length of time for this sequence of events will be ATTA.

At time T1, attendant #1 is connected to the answered call and begins talking, as shown in box 204. The average time the attendant is in active communication is known as the average attendant in-use time (AAIUT). If we assume that this attendant talks the average time, we can assume that at time T3, attendant #1 completes the call and goes on-hook.

Certainly, if we wait until time T3 to begin another call sequence, attendant #1 would sit idle for a period that would be on average equal to ATTA. Thus, for more efficiency, we must predict time T3 from our statistical base and move backward to time T2, which is shown with respect to telephone line L2 and begin the new dialing sequence. This new dialing sequence is performed by a task belonging to each attendant called the call scheduler.

Let us now introduce a third line, L3, which is presently idle, represented by block 215. As shown, if the calls follow the typed call sequence and if the statistics are accurate, this attendant's scheduler will place two no-answer calls 211, 212, followed by answered call 213 on L2. Thus, at time T3', which in the ideal situation would coincide perfectly with time T3 when attendant #1 is finished talking on line 1, a connection would be available for attendant #1 to begin talking on line L2. In the alternative, let us assume that as the attendant's scheduler is placing no-answered call 211, line L3 receives an incoming call 216. In this case, the system will terminate placing of call 211, cancel the outbound calling process for call 211 and place the incoming call 216 on hold 217 until time T3 which coincides perfectly with time T3 when attendant #1 is finished talking on line L1. Under this alternative wherein an incoming call has been received, attendant #1 would be connected to L3 to begin talking, represented by block 218. The only disadvantage suffered by virtue of this new arrangement is that the incoming caller is subject to a hold period 217 pending completion of call 204. However, because the incoming caller is probably dialing on his own convenience, the hold period 217 is not as annoying as a hold period foisted on the recipient of an outgoing call, which is usually not at the convenience of the recipient.

Although FIG. 2 has been shown and described in connection with three lines, L1, L2 and L3, it should be understood that the present invention is directed to any system comprising a plurality of lines, in other words, two or more. Three lines have simply been shown to illustrate the interaction between an operating predictor algorithm and receipt of an incoming call on a separate empty line.

Returning now to line L1, the period of time from time T1 until time T2 is known as the time to start calling (TSC). This parameter is derived by subtracting the current ATTA from the AAIUT. This time is shown in box 205, and the process is repeated with a dial no-answer box 206. Note that the predictive dialer predicts T4 to be identical whether attendant #1 is talking on line L2, per box 214, or on line L3, per box 218. In either case, the attendant talk time is predicted to be identical. Certainly, however, it is within the scope of the present invention to provide separate AAIUT statistical calculations for incoming versus outgoing calls to take into account the exigencies of separate campaigns. Dial no-answer box 206 is followed by an early answer box 207, which causes a problem. The simple solution to this problem is to put the called person on hold (perhaps playing a mechanical message) until time T7 when attendant #1 is presumably finished with the conversations on either line L2 or line L3. This, of course, is noted desirable situation and perhaps an alternate attendant would come free prior to time T7 at this point in time. An alternative method would be to disconnect the called party if no attendant is available to take the call. The party's number could be placed in a call-back queue and handled in the manner which has been previously described for handling outbound calls in general.

A statistical improvement can be made when more than one attendant is on the system. When an answer occurs from attendant number one's scheduler, it can be allowed to go to the first available attendant, instead of being constrained to go to the attendant whose scheduler generated the answer. If this occurs, the scheduler of attendant #1 should ignore the fact that its answer has been taken by some other attendant, and wait for its attendant to get an answer from another attendant's scheduler (possibly the attendant who took the call). When the original attendant does get an answer, the scheduler does its normal calculations to determine when to spawn the next calling task. Meanwhile, the scheduler task of attendant #2 who took the original answer should also calculate its normal schedule time. Since attendant #2 is talking on a "stolen" call, the scheduler should spawn a new answer task at the normally scheduled time for that attendant, even though there is already one spawned that has not answered yet. Of course, should an incoming call be received, the new answer task just spawned should be interrupted and the received incoming call routed to the first available attendant.

Certainly, when several attendants are being controlled by a statistical predictive dialing algorithm, it is not unreasonable to expect that, on a statistical basis, an attendant will come free prior to time T7 to handle the connection. Thus, when any attendant comes free, even an attendant associated with any other call scheduling routine, the free attendant is assigned to the call that has been on hold the longest, including incoming calls on hold.

By reviewing FIG. 2, it is clear that with respect to attendant #1, there are two outbound calls that are being managed concurrently, one call on L1 and one call on L2. These calls are managed by call tasks 131 and 131A as shown in FIG. 1.

As shown in FIG. 1, the predictive algorithm allows a system to automatically place calls for live attendants in such a way as to cause a new call to be answered close to the time when the attendant finishes talking on the previous call.

The call pacing algorithm as modified for incoming calls is described here as being implemented with six types of concurrent tasks. The six types of tasks are:
1) Statistics gathering task 140;
2) Queueing and control task 141;
3) Schedule task 111, 112, 113;
4) Answer task 121, 122, 123, 123A;
5) Call task 131, 131A, 132, 132A, 133, 133A, 133B, 133C; and
6) Incoming task 142, 143, 144.

There is one statistic-gathering task 140 for each campaign on the system. This task exists to calculate three important averages in the system:
Average Attendant In-Use Time (AAIUT);
Average Time-to-Answer (ATTA); and
Average Call Time (ACT).

In small systems, an individual AAIUT parameter is kept for each attendant on the system. This is kept by a windowed average of the last N calls handled by each attendant. Large systems keep a single AAIUT for all attendants. There is only one ATTA and ACT parameter for each campaign, either outbound or inbound. The ACT parameter is calculated by a windowed average of the last N calls handled by the whole campaign. The ATTA parameter is calculated from a windowed average of the last N calls handled by the system. Also, the statistics task counts aborted calls and other pertinent statistics. These parameters are used in the schedule task to control the predictive calling algorithm.

There is only one queueing task 141 for each campaign in the system. The queueing task exists to control the queue of attendants waiting for a call and the queue of customers waiting for an attendant. (These two queues are mutually exclusive at any point in time.) The queue task follows the FIFO rule for both queues, so that the attendant that has been idle the longest will get the first answered call, and the customer that has been on hold the longest will get the first free attendant. This FIFO rule is typically called "fair queueing." The queue task can also set the time that a call will wait in queue before removing the call (MQTAC).

The last four types of tasks are the schedule task 111, the answer task 121, the call task 131, and the incoming task 142. There is one scheduler task for each attendant on the system. Scheduler tasks can spawn answer tasks, and answer tasks can spawn call tasks. Incoming tasks serve to interrupt operation of answer tasks by informing schedule tasks of an incoming call.

The call task is the simplest and lowest level task of the three-level call placing task hierarchy. The call task is always spawned by an answer task, and the call task's job is to place one call and stay active until the call is disconnected.

As soon as the call task is spawn, it seizes a line and places a single call. If the call is a live answer, the call task must report two events: the answer and the attendant connect. These must be sent to the statistics-gathering task and the parent answer task as soon as they occur. The answer status is sent to both the statistics task and the parent answer task immediately when a live answer occurs. Similarly, the connect status is sent to both the statistics task and the parent answer task immediately when an attendant is connected to a call. When the call is completed and the line released, the call task must always report a call-end status to the statistics task and the parent answer task. This is true for both answered and no-answer calls. There are five categories of call-end status:

Live Answer (attendant was connected);
Dropped Call (live answer—attendant wasn't available);
No Answer;
Abort (before answer); and
Line Fault (no line available time-out).

A specific copy of the call task exists only long enough to make one call and report the various events and call-end message to the statistics and parent task. When the call is completed, that copy of the call task is destroyed by the parent answer task. The messages to the statistics task allow the statistics task to calculate PA and ACT, and from this ATTA can be derived.

The second-level task in the call-placing hierarchy is the answer task. The answer task's job is to spawn call tasks serially until one of the call tasks achieves an answer. The answer task is spawned by its parent—the schedule task. Then, when an answer finally occurs, the answer task reports that answer outcome to its parent schedule task, as well as to the statistics task.

A specific copy of the answer task exists only long enough to achieve one answer and return the answer result to its parent schedule task. That copy of the answer task is then destroyed by the parent scheduler. The answer task can persist until the answered call is completed by the attendant, and final call-end answer status is returned from the call task.

In the basic predictive algorithm, the answer task spawns only one call task at a time, serially. The answer task waits until the first call task is finished and has returned the end-call status before destroying that call task. If the end-call status was an answer, the answer task is finished and will be destroyed by its parent. If the call task returns a no-answer, dropped or fault end-call status, the answer task will spawn another call task. This, in effect, places calls serially on a single logical phone line until a call is answered. This type of answer task procedure is called a "serial" answer task, and will always result in one and only one answer.

The scheduler task is the highest-level task in the predictive algorithm. There is one scheduler task for each attendant on the system. This task's job is to schedule "answers" for its attendant by spawning answer tasks. The scheduler task gets the AAIUT parameter for its own attendant from the statistics task, and uses this average to predict when that attendant will complete the current call. The answer task has been structured to make it easy for the scheduler task to calculate when to spawn an answer task. Since the statistics task knows the average time it will take after starting an answer task for an answer to occur (ATTA) and the average time that the associated attendant will talk (AAIUT), the scheduler can determine the optimum time to spawn an answer task so that the next answer for that attendant will occur (statistically) just as the attendant completes the previous call. This optimum time is calculated with the following equation:

$$TSC = AAIUT - ATTA$$

where TSC is the time to start the answer task calling after the attendant was connected to the previous answered call.

The incoming task is an overlay to the predictive algorithm and serves as an interrupt (in the classic computer sense) to any answer task underway by reporting to a schedule task the receipt of an incoming call. The schedule task will destroy an answer task spawned by it and will immediately take the call routed via the incoming task for distribution to any free attendant.

To summarize the various components of the system:

STATISTICS TASK

Job: Collect and calculate statistics for predictive algorithm. Keep AAIUT for each attendant or system. Keep ATTA and ACT for system.
Knows:
When attendant answer starts.
When answer occurs.
When attendant is connected.
When call is completed.

QUEUE TASK

Job: Keep an ordered queue for idle attendants and another for calls on hold. Make match between attendant that has been idle the longest and first answered call. Make match between call on hold the longest and first free attendant.
Knows:
When answer occurs.
When attendant enters or leaves system.
When attendant goes idle.

CALL TASK

Job: Make one call and stay in existence until line disconnects. Report when answer occurs and when attendant connects spawned by answer-scheduler task.

Knows:
  How to place a call.
  When call is answered.
  When attendant is connected.
  When call ends.
  How to determine call outcome (answer/no answer).
  Dies after completing one call.

ANSWER TASK

Job: Trigger call tasks until it gets an answer. Report result to answer-scheduler spawned by answer-scheduler task.

Knows:
  How to trigger a call task.
  How to interpret call task status reports.
  When to trigger subsequent call tasks.
  Dies after line is disconnected.

SCHEDULER TASK

Job: To schedule answers for attendants to occur when attendants get free. Spawned when attendant logs on system.

Knows:
  Gets ATTA, AAIUT for that attendant.
  How to calculate time delay before starting answer task.
  How to set delay timer (answer timer).
  How to trigger answer task.
  When attendant is connected to call.
  When attendant has completed call.
  Dies when attendant logs off.

INCOMING TASK

Job: To report to schedule task when an incoming call is received to thereby destroy an answer task associated with that schedule task.

Knows:
  When an incoming call is received.
  When incoming call has been assigned to a particular attendant.

From the foregoing description, it is apparent that the invention described herein provides a novel inbound/outbound calling connection system for handling by an attendant (or by an automatic computer controlled interactive call handling system) comprising calling means for automatically attempting outbound call placement, the calling means monitoring and adjusting attempted outbound calling connections based on call completion times and availability of the attendant and receiving means for queueing an inbound call for connection to the attendant, the incoming call receiving means adjusting operation of the calling means to account for receipt of the inbound call.

Although the present invention and its advantages have been described in detail, it should be understood that various changes, substitutions and alterations can be made herein without departing from the spirit and scope of the invention as defined by the appended claims.

What is claimed is:

1. An inbound/outbound calling connection system, comprising:
   calling means for automatically attempting outbound call placement, said calling means monitoring and adjusting attempted outbound calling connections based on call completion times and availability to handle completed calls; and
   incoming call receiving means for queueing inbound calls, said incoming call receiving means adjusting operation of said calling means to account for receipt of each said received inbound call.

2. The system as recited in claim 1 wherein said calling means comprises means for monitoring system statistical parameters concerning said call completion times and said availability of handling said completed calls.

3. The system as recited in claim 2 wherein said completed calls are handled by an attendant and wherein said calling means comprises means for determining actual busy-idle status of said attendant.

4. The system as recited in claim 3 wherein said calling means comprises means for completing calls to a first available idle attendant without regard for whom the call attempt was initiated.

5. The system as recited in claim 3 wherein said system comprises means for establishing system operating setpoints depending upon a degree of desired utilization of any said attendant and upon an amount of non-communication holding time to which a completed call to connection is to be subject.

6. The system as recited in claim 5 wherein said calling means is responsive to said system setpoints establishing means.

7. The system as recited in claim 3 wherein said statistical parameters monitoring means comprises means for calculating the average time to a valid answer and means for deriving an average attendant in-use time.

8. The system as recited in claim 7 wherein said derivation of average attendant in-use time is calculated separately for each attendant.

9. The system as recited in claim 7 wherein said derivation of average attendant in-use time is calculated separately for inbound and outbound calling campaigns.

10. The system as recited in claim 9 wherein said establishing means comprises:
    means for calculating a time to start calling based upon the calculated difference between said average attendant in-use time and said average time to a valid answer; and
    means for adjusting said time to start calling parameter in accordance with said setpoints.

11. The system as recited in claim 10 wherein said average time to a valid answer calculating means comprises:
    means for calculating a probability of answer over a time period; and
    means for calculating an average calling time over said period of time.

12. The system as recited in claim 11 wherein said average time to a valid answer calculating means further includes means for dividing calculated ones of said average calling time by calculated ones of said probability of answer.

13. The system as recited in claim 12 further comprising means for performing said calculations on a campaign-by-campaign basis.

14. An inbound/outbound calling connection system for handling by an attendant, comprising:
    calling means for automatically attempting outbound call placement, said calling means monitoring and adjusting attempted outbound calling connections based on call completion times and availability of said attendant; and incoming call receiving means for queueing an inbound call for connection to said attendant, said incoming call receiving means adjusting operation of said calling means to account for receipt of said inbound call.

15. The system as recited in claim 14 wherein said calling means comprises means for monitoring system statistical parameters concerning said call completion times and said availability of handling said completed calls.

16. The system as recited in claim 15 wherein said calling means comprises means for determining actual busy-idle status of said attendant.

17. The system as recited in claim 16 wherein said calling means comprises means for completing calls to a first available idle attendant without regard for whom the call attempt was initiated.

18. The system as recited in claim 16 wherein said system comprises means for establishing system operating setpoints depending upon a degree of desired utilization of said attendant or upon an amount of non-communication holding time to which a completed call to connection is to be subject.

19. The system as recited in claim 18 wherein said calling means is responsive to said system setpoints establishing means.

20. The system as recited in claim 16 wherein said statistical parameters monitoring means comprises means for calculating the average time to a valid answer and means for deriving an average attendant in-use time.

21. The system as recited in claim 20 wherein said derivation of average attendant in-use time is calculated separately for each attendant.

22. The system as recited in claim 20 wherein said derivation of average attendant in-use time is calculated separately for inbound and outbound calling campaigns.

23. The system as recited in claim 22 wherein said establishing means comprises:

means for calculating a time to start calling based upon the calculated difference between said average attendant in-use time and said average time to a valid answer; and means for adjusting said time to start calling parameter in accordance with said setpoints.

24. The system as recited in claim 23 wherein said average time to a valid answer calculating means comprises:

means for calculating a probability of answer over a time period; and means for calculating an average calling time over said period of time.

25. The system as recited in claim 24 wherein said average time to a valid answer calculating means further includes means for dividing calculated ones of said average calling time by calculated ones of said probability of answer.

26. The system as recited in claim 25 further comprising means for performing said calculations on a campaign-by-campaign basis.

27. A method for connecting calls in an inbound/outbound calling connection system, comprising the steps of:

automatically attempting outbound call placement by monitoring and adjusting attempted outbound calling connections based on call completion times and availability to handle completed calls; and adjusting operation of said attempted outbound calling connections to account for receipt of an inbound call.

28. The method as recited in claim 27 wherein said step of automatically attempting outbound call placement comprises the step of monitoring system statistical parameters concerning call completion times and attendant availability.

29. The method as recited in claim 27 wherein said outbound call placement is made based on a probable availability of an attendant.

30. The method as recited in claim 27 wherein said outbound call placement is made based on a determination of actual busy-idle status of said attendant.

31. The method as recited in claim 27 wherein attempted calls are completed to a first available idle attendant without regard to an actual attendant for which a call attempt was initiated.

32. The method as recited in claim 27 further comprising the step of:

establishing system operating setpoints depending upon a degree of desired utilization of said attendant and depending upon an amount of non-communication holding time to which a completed call connection is to be subject.

33. The method as recited in claim 32 wherein said adjusting step is also responsive to said system setpoints establishing step.

34. The method as recited in claim 28 wherein said statistical parameters comprise:

calculating an average time to a valid answer; and deriving an average attendant in-use time.

35. The method as recited in claim 34 wherein said derivation of average attendant in-use time is calculated separately for each attendant.

36. A system for controlling inbound and outbound calls in an attendant system where the system has multiple attendants handling calls to and from multiple called parties all under processor control and where there can be several call completion attempts before a live called party answers a called connection, the system comprising:

a computer having a database of telephone line numbers and data information pertaining to each said line;

a processor for controlling the establishment of said calls in response to telephone line numbers supplied by said computer;

a plurality of attendant terminals connected both to said computer and said processor;

said processor comprising:

a statistical task running in said processor, said statistical task including:

means for determining the average attendant in-use times which includes any time said attendant is not available to communicate with a live called party; and means for determining the average time it takes for a live answer to occur on a series of outbound placed calling connections;

a queueing task for maintaining an ordered queue of ordered agents and an ordered queue of live answered calls not actively communicating (on hold) with an attendant;

at least one call task assigned to each attendant for making individual calls under control of calling numbers furnished by said processor;

at least one answer task operable for starting and stopping said call tasks for a particular attendant, said answer task including:

means for reporting to said processor and to said statistical and queuing tasks when a live answer occurs and when an attendant connects to said live answer connection;

a schedule task individual to each attendant, said schedule task including:

means for connecting said associated attendant to a live answered line under control of said queueing task and based upon information provided by said answer and call task; and wherein;

said processor including means operative in response to said schedule task and a connection between an attendant on a live answered line, for providing the called telephone number of said answered line to said attendant's terminal; and incoming call receiving means for queueing inbound calls for connection to one of said multiple attendants, said incoming call receiving means adjusting operation of said means for determining average agent in-use time, said means for determining the average time it takes for a live answer to occur and at least one call task to account for receipt of each of said received inbound calls.

37. The system as recited in claim 36 further comprising:

means in said terminal for accepting said called telephone numbers from said processor and for communicating said telephone number to said computer as an access to said data information in said computer.

38. The system as recited in claim 37 wherein said calculation of average attendant in-use time is calculated separately for each attendant.

39. The system as recited in claim 38 and wherein each said call task includes:

means for calculating a time to start calling based upon the calculated difference between said average attendant in-use time and said average time to a valid answer; and means for adjusting said time to start calling parameter in accordance with set points.

40. The system as recited in claim 39 wherein said average time to a valid answer calculating means comprises:

means for calculating a probability of answer over a time period; and means for calculating an average calling time over said period of time.

41. The system as recited in claim 40 wherein said average time to a valid answer calculating means further comprises:

means for dividing calculated ones of said average calling time by calculated ones of said probability of answer.

42. The system as recited in claim 41 further comprising:

means for performing said calculations on a campaign-by-campaign basis.

43. The system as recited in claim 37 further comprising:

means for monitoring said statistical parameters individually for each said attendant; and means for establishing calls on an attendant-by-attendant basis depending upon said monitored statistical parameters for said attendant.

44. The system as recited in claim 43 further comprising:

an attendant call completion queue; and means for assigning said call completions to said queue regardless of which attendant for whom the call was established.

45. The system as recited in claim 44 wherein idle attendants are connected to a next available established call from said call completion queue.

* * * * *